(12) United States Patent
Kassai et al.

(10) Patent No.: US 7,871,037 B2
(45) Date of Patent: Jan. 18, 2011

(54) EMERGENCY LANDING APPARATUS

(76) Inventors: Shahin Kassai, #6, Ally #8, Nobakht St, Tehran, TE (IR); Rustom Dinyariyan, #6, Ally #8, Nobakht St, Tehran, TE (IR)

( * ) Notice: Subject to any disclaimer, the term of this patent is extended or adjusted under 35 U.S.C. 154(b) by 525 days.

(21) Appl. No.: 11/936,883

(22) Filed: Nov. 8, 2007

(65) Prior Publication Data
US 2010/0038479 A1   Feb. 18, 2010

(51) Int. Cl.
*B64F 1/00* (2006.01)
(52) U.S. Cl. .................................................. 244/110 E
(58) Field of Classification Search ............ 244/110 R, 244/110 E, 110 F, 114 R; 114/261
See application file for complete search history.

(56) References Cited

U.S. PATENT DOCUMENTS

| | | | | |
|---|---|---|---|---|
| 1,164,967 | A * | 12/1915 | Thorp | 114/261 |
| 1,830,228 | A * | 11/1931 | Glennan | 244/110 E |
| 3,128,066 | A * | 4/1964 | Bailey | 244/114 R |
| 3,567,159 | A * | 3/1971 | Klein | 244/114 R |
| 4,653,706 | A * | 3/1987 | Ragiab | 244/110 E |
| 6,394,391 | B1 * | 5/2002 | Lo | 244/110 E |
| 6,695,255 | B1 * | 2/2004 | Husain | 244/110 E |

* cited by examiner

*Primary Examiner*—Galen Barefoot
(74) *Attorney, Agent, or Firm*—Barry Choobin; Choobin & Chobin Consultancy. L.L.C

(57) ABSTRACT

The present invention discloses an apparatus for emergency landing comprising: an extraction vehicle (10), a first adjustable tower and a second adjustable tower (11), a first gearbox (4) wherein said gearbox is mounted on top of said first adjustable tower, a second gearbox wherein said second gearbox is mounted on the top of said second adjustable tower, a third gearbox wherein said third gearbox is mounted on lower right side of said chassis, a fourth gearbox unit wherein said unit is mounted on the lower left side of chassis, a first rubber restrainer (8) wrapped around said first gearbox unit and extended to said third gearbox unit wherein said rubber restrainer is wrapped around said third gearbox unit, a second rubber restrainer wrapped around said second gearbox unit and extended to said fourth gearbox unit, wherein said rubber restrainer is wrapped around said fourth gearbox unit, wherein said first and said second rubber restrainer stabilize said aircraft and reduce initial impact by said aircraft.

6 Claims, 10 Drawing Sheets

EMERGENCY LANDING APPARATUS

The present invention is sponsored by Iranian National Science Foundation

FIELD OF THE INVENTION

The present invention relates to emergency landing apparatus for aircrafts intended to lessen the danger of emergency landing and, specifically, to a mobile base adapted to be driven along an aircraft landing strip to intercept and support an aircraft descending toward the strip during landing.

BACKGROUND OF THE INVENTION

At times, emergency aircraft landings are required where the landing gear or undercarriage is inoperative and retained in a retracted position. This is sometimes referred to as "belly landing." Such landings cause considerable damage to the aircraft, with attendant dangers for the passengers and crew. These dangers are caused partly by the extensive damage to the aircraft fuselage which occurs as the aircraft contacts the runway, but also due to sparks being produced by the aircraft sliding down the runway. Since gasoline or jet fuel is often spilled in an emergency landing, such sparks present a great hazard to the passengers and crew.

Various devices have been suggested to minimize the risk of emergency landings of this type. For instance, early attempts included tensioning wire or nets which were strung across the runway to receive the aircraft nose section and thereby shortening the landing path. However, such techniques create a great shock or impact upon the aircraft which is likely to cause extensive damage.

Another technique is to apply a carpet of foam to the airport runway. This technique lessens the danger of a fire or explosion, but extensive damage to the aircraft cannot be avoided and such a foam carpet is expensive and can only be used once. After use of the foam, it must be removed by washing down the runway, which causes a shut down in air traffic for a number of hours.

Other devices have been suggested which incorporate a movable bed or base for intercepting and receiving a landing aircraft. The prior art devices have all suffered from various disadvantages. For instance, certain of the prior art devices required specially constructed roller systems or conveyors supplied by a dedicated runway. Other of the devices did not provide a sufficient landing area or means to effectively limit the forward travel of the aircraft upon contact. Also, certain of the prior art devices failed to adequately take into account the problem of sparks being generated upon contact with the aircraft.

For example U.S. Pat. No. 4,653,706 discloses an emergency aircraft landing device which fails to solve the problem in an event that at least one of the aircraft wheels malfunctions and remains open while other wheels do not open. Therefore, it causes the aircraft to land in an imbalance mode. Thus, it causes an imbalance landing which causes the aircraft wings hit the ground.

Yet in another example U.S. Pat. No. 3,567,159 discloses an emergency aircraft landing device which fails to solve the problem of containing the nose of the aircraft. Considering that focal point of plane is between wheels which support the nose of the aircraft and wheels which support the wings of the aircraft. However, in new aircrafts distance between front and back axes (nose wheels and wing wheels) is long.

The present invention solves the problem for those aircrafts which can not activate all or some of their wheels for any reason and failure at the time of landing and prevent any accident at the time of landing. The current system which is in use today is to use foam for minimum safe landing which is sprayed over the run way and minimizes the aircraft friction with the runway so that the aircraft may land over the foam on its under-nose surface. So the aforementioned plans could not attract the confidence of the authorities in this industry and it may be even said that such plans would endanger the passengers life and aircraft itself while weather condition and side winds at the first of the runway which make the aircraft unstable when landing, were not considered in these plans and as the aircraft is placed on the media very close to the ground surface there is the danger that wings and nose are collided with the run way surface while in cases where some wheels are not activated and other are activated, this system can not be operative at all.

For instance in U.S. Pat. No. 706, if the wheel under the nose of wing is activated they would be collided with the surface and the aircraft would be crashed and destroyed. Another point is that in such systems the wing length is not considered, which is 64 meter from each side in 747. Then with the smallest movement of the aircraft, wings would hit the ground with the speed of 230 km/h. In U.S. Pat. No. 3,567,159, in addition to the aforesaid problems no point has been considered for placement of the nose. As the aircraft center of gravity is somewhere between rear and front wheels and the wheel base is very wide up to the point under the nose and these aspects have not been considered in this plan since supposing that the aircraft is landed over the system, nose would hit the runway and is disintegrated. Then the function of such system designed to save the aircraft would be useless and ineffective. For instance in a 747 aircraft, the wheel base is 84 ft (25 m). If the aircraft should be grabbed with this system no point has been calculated for placement of the aircraft center of gravity which is located between front and rear axis, then the aircraft would hit the ground with nose or tail.

We have proposed a plan in which the aircraft is grabbed in a height of 9 meter from the ground level and is placed over the system. In our plan the problem of activated and non-activated wheels has been removed for the pilot to land the aircraft. In our plan the conditions have been calculated in a way that the aircraft would be landed on designed points over the apparatus with no damage and it may be repaired then or may be even loaded on the runway by it with no need to any crane.

Therefore, there is a disadvantage in above patent since it fails to contain the nose of the aircraft which can be so called nose dived.

These and other disadvantages are overcome by the landing device of the present invention, as will be apparent in the written description which follows.

SUMMARY OF THE INVENTION

A primary object of the present invention is to provide an emergency landing apparatus comprising: an extraction vehicle (10) for an aircraft, wherein said vehicle comprises of: a chassis, wheels, brakes (6), suspension system, jet engine (7), wherein said chassis supports, a first adjustable tower and a second adjustable tower (11), a first gearbox (4) wherein said gearbox is mounted on top of said first adjustable tower, a second gearbox wherein said second gearbox is mounted on the top of said second adjustable tower, a third gearbox wherein said third gearbox is mounted on lower right side of said chasse, a fourth gearbox unit wherein said unit is mounted on the lower left side of chassis, a first rubber restrainer (8) wrapped around said first gearbox unit and extended to said third gearbox unit wherein said rubber restrainer is wrapped around said third gearbox unit, a second rubber restrainer wrapped around said second gearbox unit and extended to said fourth gearbox unit, wherein said rubber restrainer is wrapped around said fourth gearbox unit, wherein said first and said second rubber restrainer stabilize said aircraft and reduce initial impact by said aircraft; a first moveable wing supporter, a second moveable wing supporter, wherein between said first moveable wing supporter and said second moveable wing supporter (2), a gap is created wherein said gap accommodates space for undercarriage of said aircraft; a first air bag and a second air bag (1); an adjustable nose supporter unit (3), wherein said nose supporter unit covered by rubber and airbag and wherein said adjustable nose supporter holds nose of said aircraft, thereby preventing said nose to hit the ground of a runway; a first ramp (15) and a second ramp (16), wherein said first ramp is installed inside of said apparatus and second ramp is installed at the end of said first ramp.

Another object of the present invention is to provide an emergency landing apparatus wherein said apparatus provides a system where at the time of extracting said aircraft, said gearboxes connected to said towers release said rubber restrainer in accordance to a force received from said wings, thereby minimizing impact and stabilizing said aircraft. Yet another object of the present invention is to provide an emergency landing apparatus wherein said apparatus provides a system for unloading said aircraft from said apparatus comprising: said gearboxes connected to said towers restraint said rubber restrainer by winding up said rubber restrainer around the gearbox pulley which moves the aircraft backward; placing nose wheel of said aircraft on said first ramp inside the apparatus wherein said first ramp is elevated by a hydraulically-activated jack; placing rear wheels of said aircraft on said second ramp wherein said second ramp is installed at the end of the first ramp, thereby guiding said aircraft toward a run way surface safely.

Another object of the present invention is to provide an emergency landing apparatus wherein said apparatus provides a first adjustable wing supporter and a second adjustable wing supporter which stabilize said aircraft when at most one wheel of undercarriage remains open and rest of wheels remain closed.

Another object of the present invention is to provide an emergency landing apparatus wherein said apparatus provides a gap between first adjustable wing supporter and said second adjustable wing supporter wherein said gap allows repairing and/or opening of said remained closed wheels while said aircraft is on said apparatus.

DETAILED DESCRIPTION OF THE INVENTION

Figure 1:
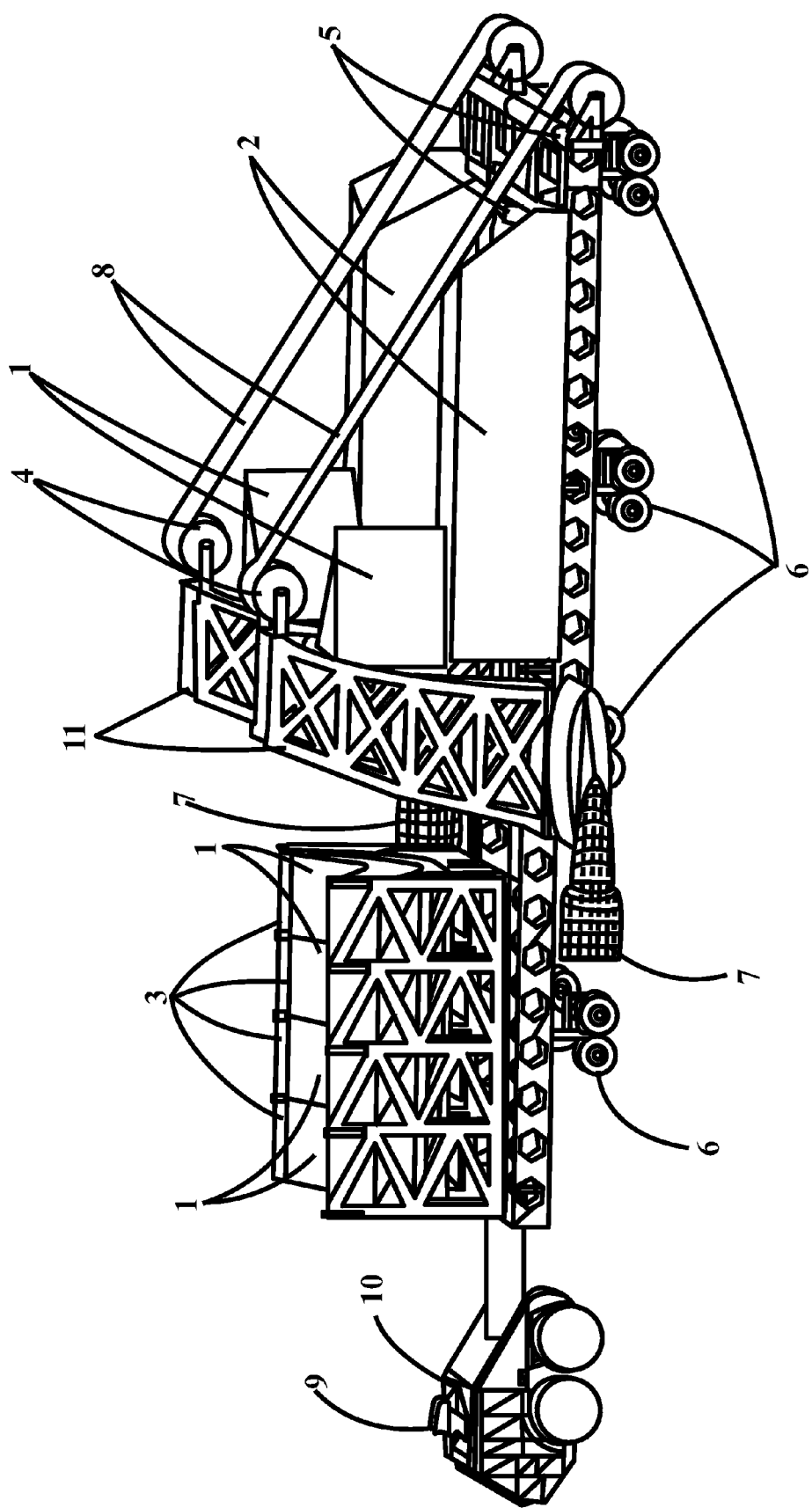
FIG. 1 is a detailed representation of the apparatus.

FIG. 1—Shows the components of the apparatus.

Airbag behind the towers to absorb wing shocks (1); Wing supporter having steel structure and rubber cover for the wings to be placed on them (2); Nose supporter with steel structure, resistant against nose to be place on itself (3); four gear boxes with bobbin to release and wind up the rubber restrainer (4); Hydraulic Jacks for moving the wing supporters, towers, nose supporter (5); Apparatus wheels similar to those used in different aircrafts with suspension system, shock absorbers and brake system (6); Jet engines to provide the driving force for the apparatus to reach the required speed between 230 to 260 km (7); rubber restrainer acting as shock absorber (8); Fire extinguisher nozzle (9); vehicle to transport the apparatus from parking lot to the run way and vice versa (10); Two towers with steel structure and rubber covers to connect the gearboxes and rubber restrainer.

Figure 2:
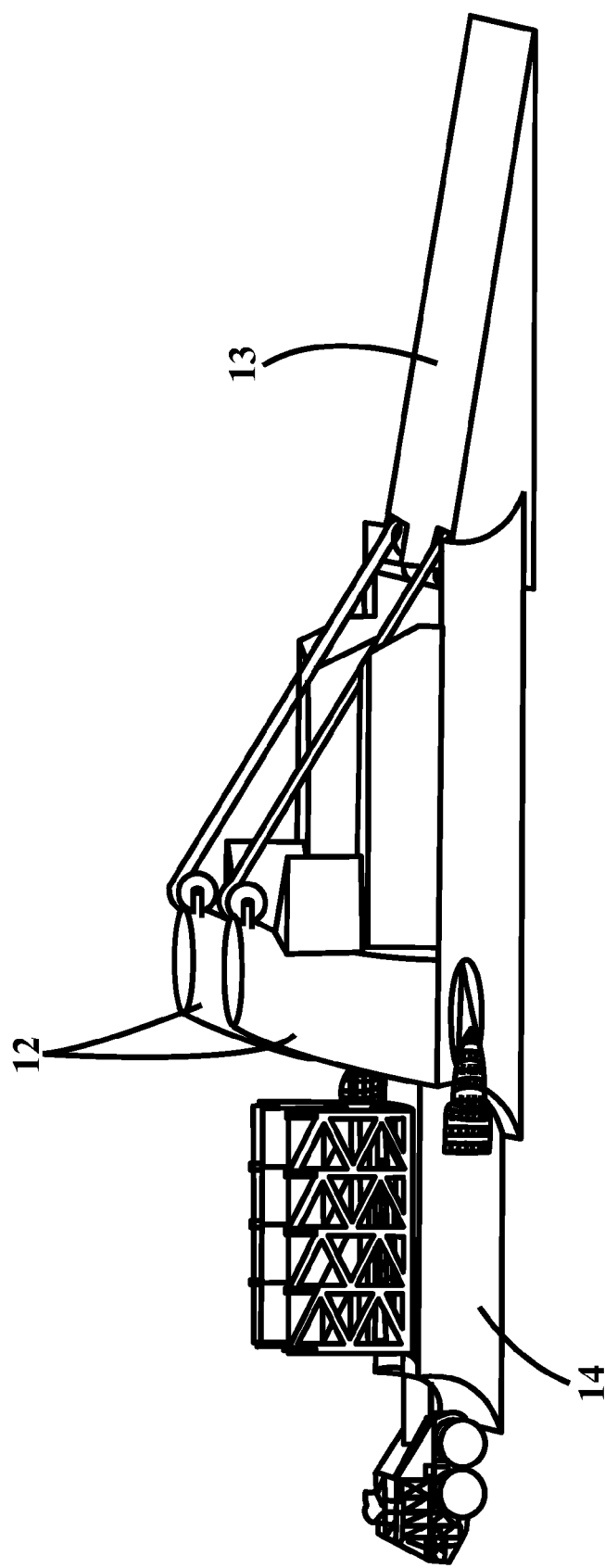
FIG. 2 is a general view of the present invention.

FIG. 2 shows a General view form the apparatus in which rubber restrainer cover over the tower is identified (12), apparatus body (14) and independent ramp is identified with no. 13.

Figure 3:
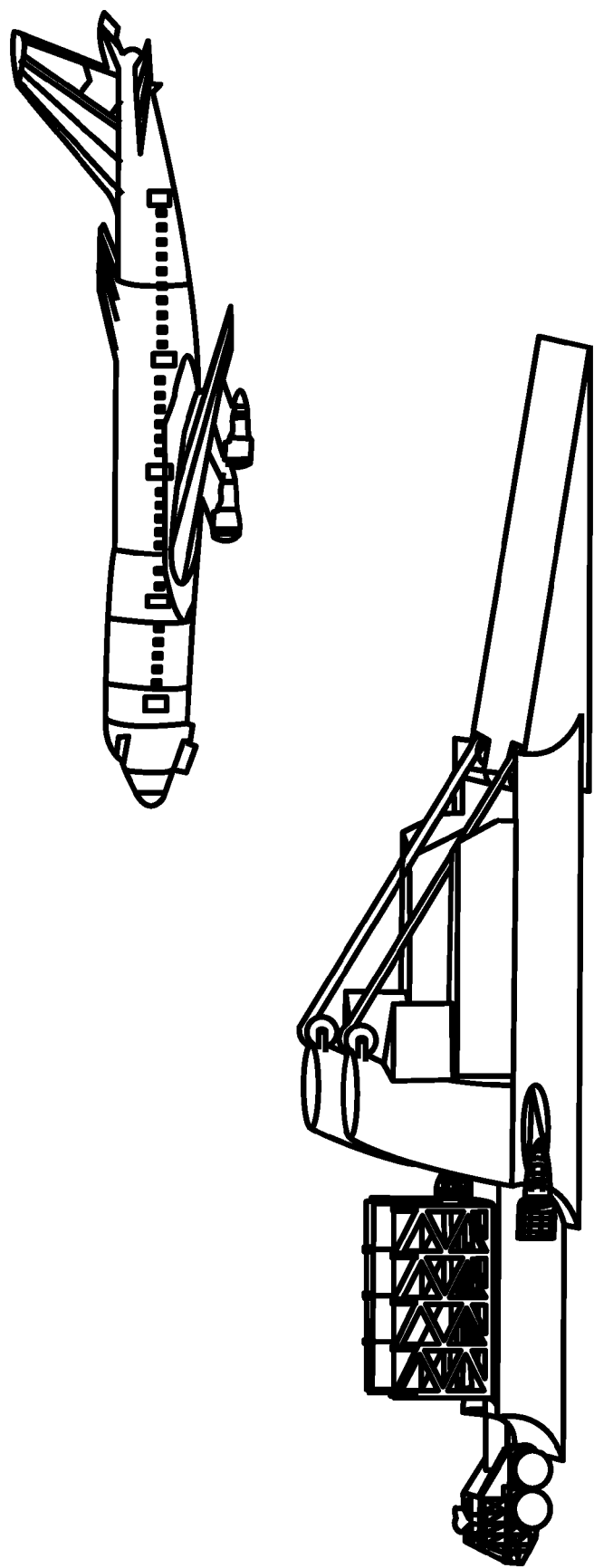
FIG. 3 is an illustration of an aircraft approaching the invention apparatus.

FIG. 3 shows the aircraft approaching, movement of the apparatus and equalization of aircraft-apparatus speed.

Figure 4:
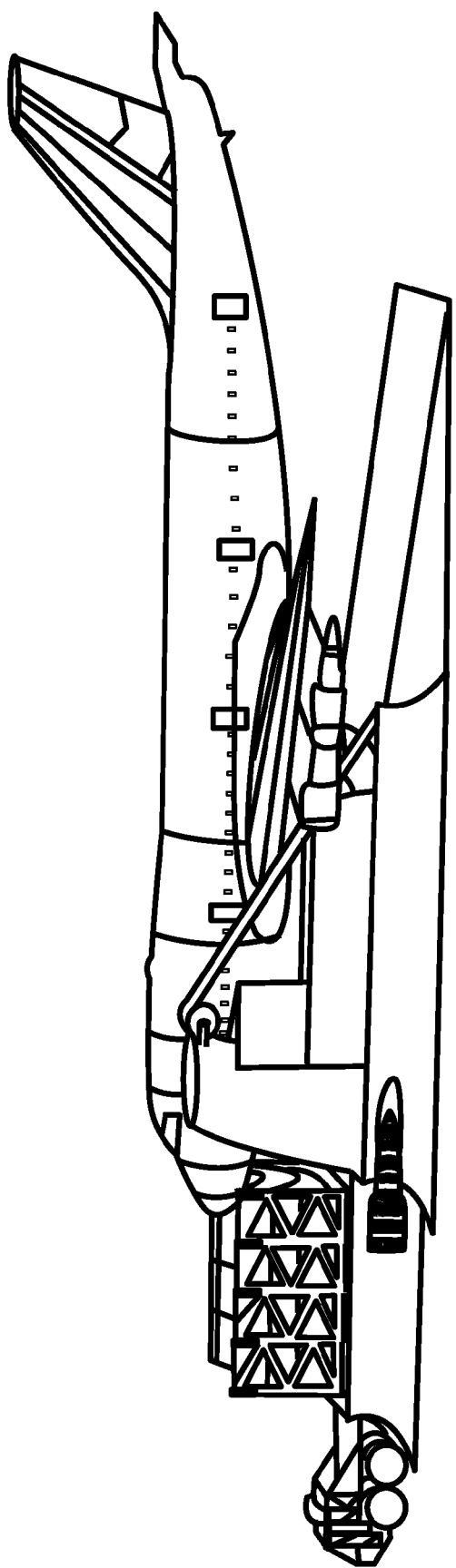
FIG. 4 is an illustration of first and second robber restrainer stabilizing the aircraft and reducing initial impact by said aircraft.

FIG. 4 shows coordinating speed of apparatus and aircraft, the collision of aircraft wings with two rubber restrainer in 9 meter altitude from the ground is shown in this figure.

Figure 5:
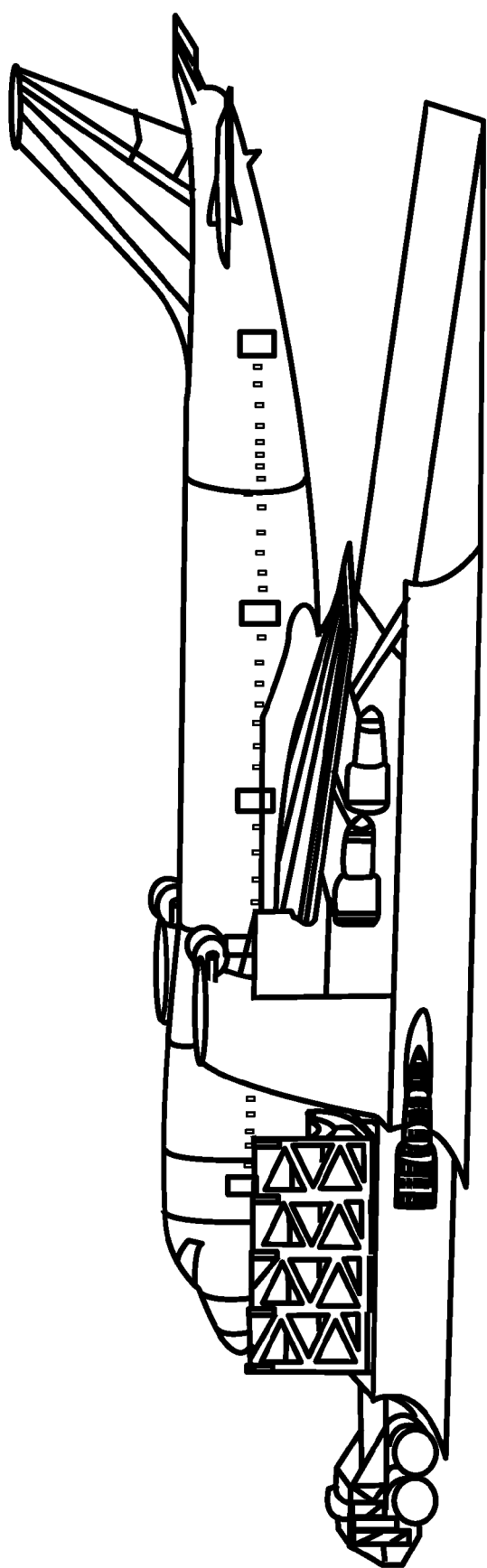
FIG. 5 is graphical representation of the aircraft when landing is completed.

FIG. 5 shows bending, domination of rubber restrainer, full capture by rubber restrainer and placement of aircraft on wing supporters and nose supporters.

Figure 6:
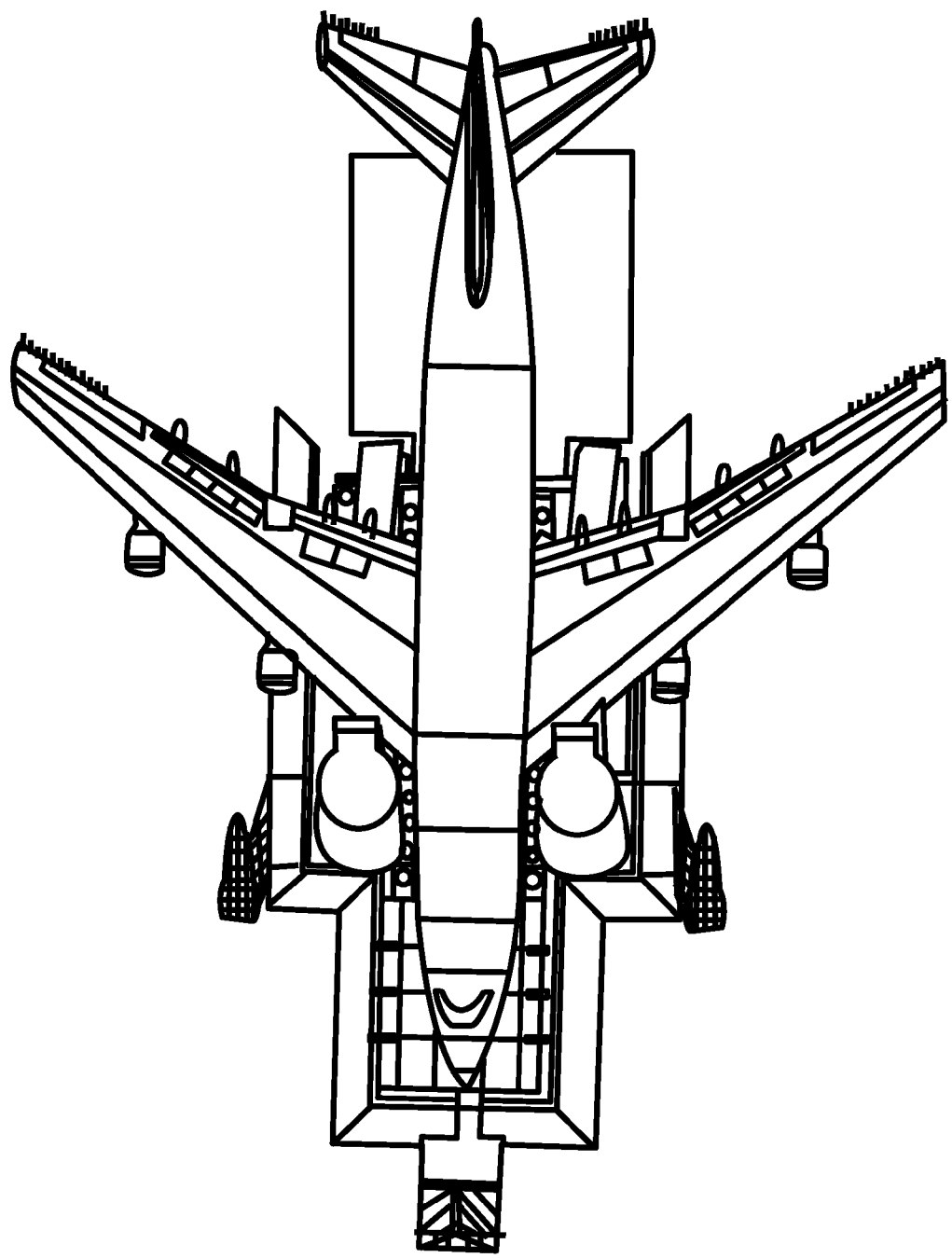
FIG. 6 is top view of a landed aircraft on the present invention apparatus.

FIG. 6 shows a general view of aircraft from upper view in a manner showing the stability and equilibration of the aircraft, for being placed over the apparatus, wing status behind the towers, the distance between two towers opening, for instance 747 aircraft nose and passing the distance, aircraft engines distance form the apparatus are shown in this figure.

Figure 7:
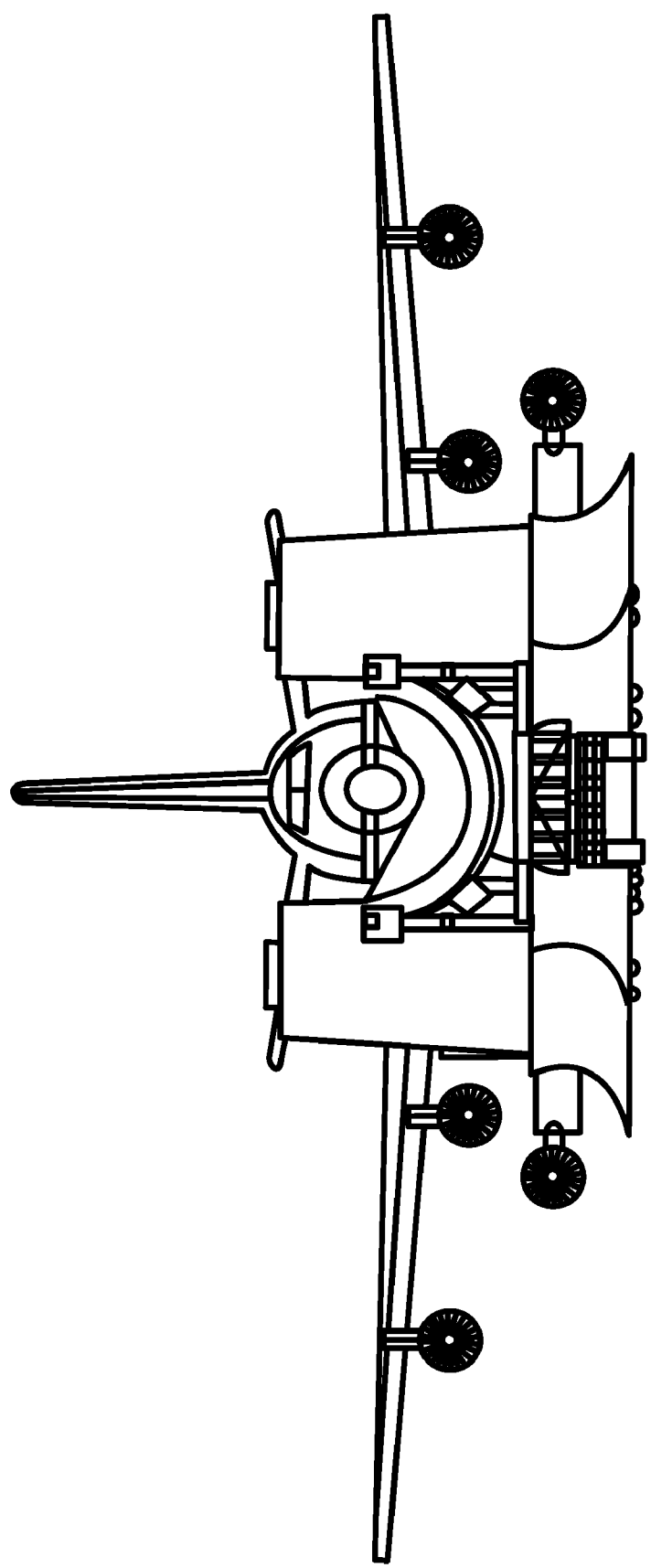
FIG. 7 is a front view of a landed aircraft on the present invention apparatus.

FIG. 7 shows a front view of the aircraft over the altimeter, engines location, their distance from the apparatus in whole and jet engines are shown under this figure.

Figure 8:
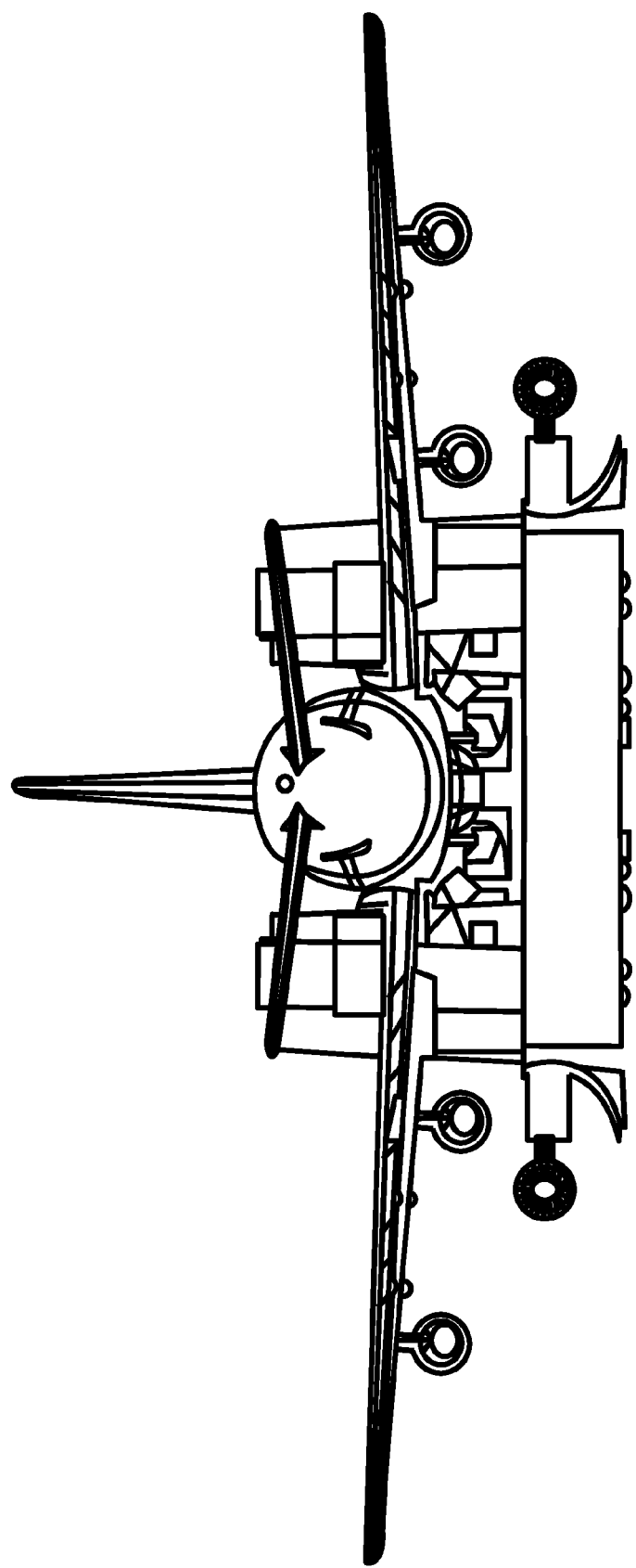
FIG. 8 is a rear view of a landed aircraft on the present invention apparatus.

FIG. 8 shows an aircraft in the apparatus from the back view where opened wheels of the aircraft are shown in the apparatus.

Figure 9:
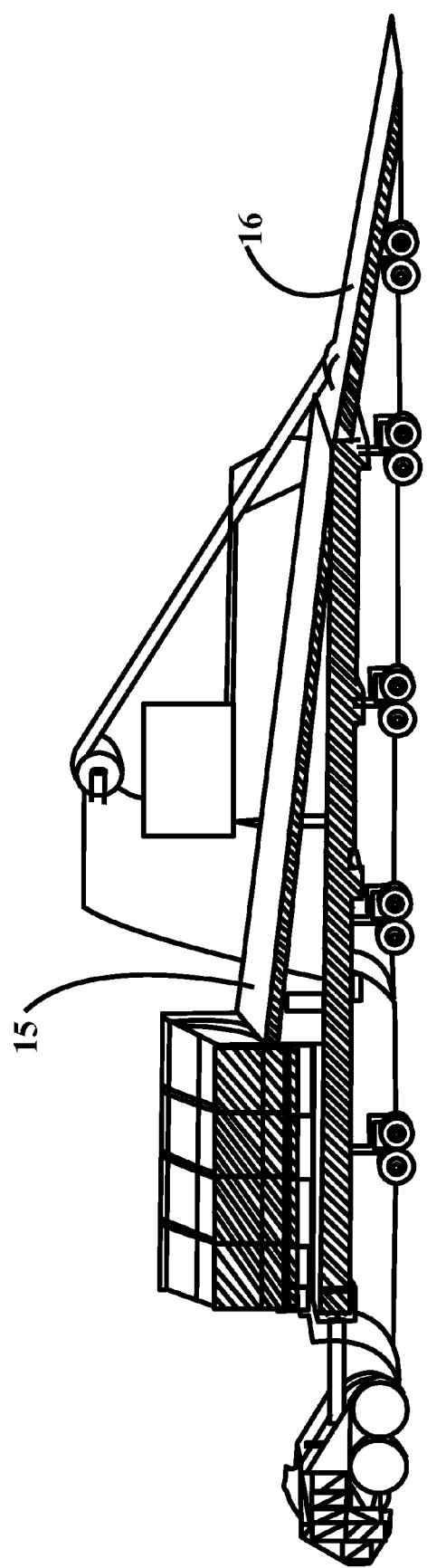
FIG. 9 is a graphical representation of a sectional view comprising ramp 15 and ramp 16.

FIG. 9 shows apparatus longitudinal section for showing mobile ramp inside the vehicle is represented by 15 and outer ramp connected to the apparatus is represented by 16.

Figure 10:
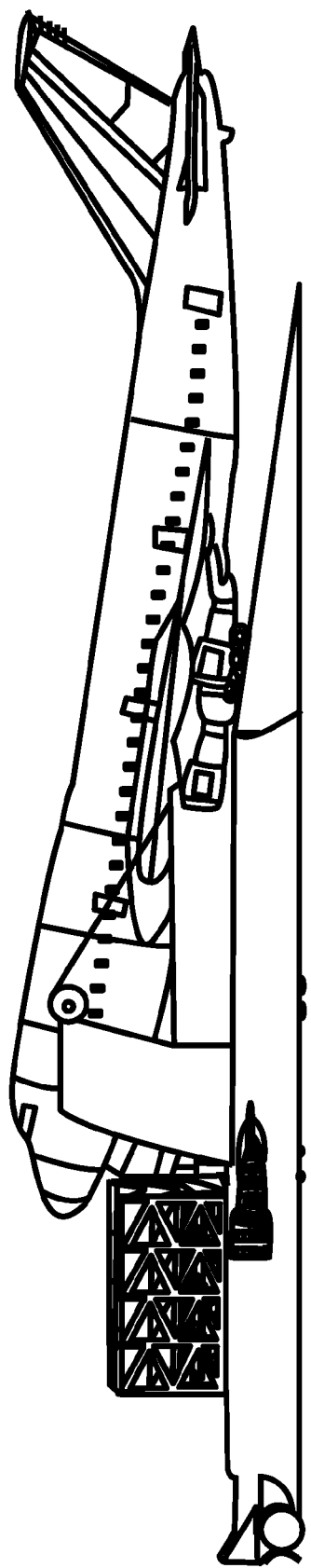
FIG. 10 is a general view of the apparatus and aircraft in reverse motion wherein gearboxes connected to the towers restraint said robber restrainer by winding up the robber restrainer around the gearbox pulley.

FIG. 10 shows a general view of the apparatus and aircraft in reverse motion where rubber restrainer functions and aircraft moves backward to be placed on the run way and unloading of the aircraft from the apparatus are shown here.

At first an extraction vehicle for an aircraft connected to the apparatus is moved from its parked position and places the apparatus at the beginning of the run way. The apparatus would be ready with its engines starting up and then it starts moving on the runway as shown in FIG. 2.

Then the vehicle starts to move on the run way, raises its speed up to that of the aircraft which is in approach position using on board computer which is connected to the aircraft autopilot system. FIG. 3 shows a 747 Boeing landing with a speed of approximately 136 mph/h. When the speed of the present invention apparatus is exactly the same as the speed of the aircraft, aircraft would be placed over the vehicle in contact with two rubber restrainer shown in FIG. 4 from the wing area. Rubber restrainer are connected to the gearbox and bobbin installed over the towers.

Gearboxes would act in a manner that when the wings come in contact with the rubber restrainer release the rubber restrainer under pressure and the aircraft would be stopped behind the rubber restrainer in the height of or above 9 meter while with lowering the height and coordinating speed of aircraft with the present invention apparatus, docking would occur smoothly. With full connection and losing altitude the aircraft would be braced at three points, first at the rubber restrainer which now are formed into the wing shape and secondly over the wing supports having a steel structure and rubber cover. There are air bags over the wing supporters and behind the towers to guarantee smooth and shock free landing. Then the nose is placed on a metal structure covered with rubber layer and numerous air bags forming cushions in a semicircle shape. The reason for designing cushion-shape air bags under the nose is that in case the nose wheel is open, said nose wheel would be placed in between the cushions preventing the air bag to be exploded (see FIG. 5). Then the aircraft would be completely landed on the apparatus while nose and wings are placed in the designated areas, wings are stopped behind the towers and nose is passed through the towers which is 7 times bigger than the nose of 747 Aircraft and is placed on the nose support (see FIG. 6). Going a certain distance the aircraft would be controlled by the vehicle in which case the vehicle can decelerate and fully stop the aircraft. After full stop and for wheel repair by engineers, the apparatus deck is raised using hydraulic jacks creating a ramp form. This ramp (15) inside the apparatus is placed in the frontal part of the system in a manner that when gearboxes start to wind the rubber restrainer up moving the aircraft backward, then nose wheel is moving over the first ramp and finally the wheels under the wings are moving over the second ramp connected to the apparatus end, so the aircraft would be downloaded over the runway fully supported and controlled (see FIGS. 7 and 8).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An emergency landing apparatus comprising: an extraction vehicle for an aircraft, wherein said vehicle comprises of:
   a chassis;
   a first adjustable tower and a second adjustable tower;
   a first gearbox unit wherein said first gearbox unit is mounted on top of said first adjustable tower;
   a second gearbox unit wherein said second gearbox unit is mounted on the top of said second adjustable tower;
   a third gearbox unit wherein said third gearbox unit is mounted on lower right side of said chassis;
   a fourth gearbox unit wherein said fourth gearbox unit is mounted on the lower left side of said chassis;
   a first rubber restrainer wherein said first rubber restrainer wrapped around said first gearbox unit and extended to said third gearbox unit wherein said rubber restrainer is wrapped around said third gearbox unit;
   a second rubber restrainer wherein said second rubber restrainer wrapped around said second gearbox unit and extended to said fourth gearbox unit, wherein said second rubber restrainer is wrapped around said fourth gearbox unit;
   a first moveable wing supporter and a second moveable wing supporter, wherein between said first moveable wing supporter and said second moveable wing supporter a gap is created wherein said gap accommodates space for undercarriage of said aircraft;
   a plurality of airbags;
   an adjustable nose supporter unit, wherein said adjustable nose supporter unit covered by rubber and airbag and wherein said adjustable nose supporter unit holds nose of said aircraft, thereby preventing said nose to hit the ground of a runway;
   a first ramp and a second ramp, wherein said first ramp is installed inside of said apparatus and second ramp is installed at the end of said first ramp;
   wheels attached to said chassis;
   brakes;
   suspension system;
   and at least two Jet engines to provide a driving force to the apparatus reach a required speed.

2. An emergency landing apparatus as claimed in claim 1, wherein said apparatus provides a system wherein at time of extracting said aircraft, said gearboxes connected to said towers release said robber restrainer in response to a force received from said aircraft wings, thereby minimizing impact and stabilizing said aircraft.

3. An emergency landing apparatus as claimed in claim 1, wherein said apparatus provides a system for unloading said aircraft from said apparatus wherein said system comprises:
   plurality of gearboxes unit connected to said towers, wherein said plurality of gearboxes restraint said rubber restrainer by winding up said rubber restrainer around gearbox pulley, thereby moving the aircraft backward;
   placing nose wheel of said aircraft on said first ramp inside the apparatus wherein said first ramp is elevated by a hydraulically-activated jack;
   placing rear wheels of said aircraft on said second ramp wherein said second ramp is installed at the end of the first ramp, thereby guiding said aircraft toward a runway surface safely.

4. An emergency landing apparatus as claimed in claim 1, wherein said apparatus provides a first adjustable wing supporter and a second adjustable wing supporter which stabilize said aircraft when at most one wheel of undercarriage in said aircraft remains open and rest of wheels of said aircraft remain closed.

5. An emergency landing apparatus as claimed in claim 1, wherein said apparatus provides a gap between first adjustable wing supporter and said second adjustable wing supporter wherein said gap allows repairing and/or opening of said remained closed wheels of said aircraft while said aircraft is on said apparatus.

6. An emergency landing apparatus as claimed in claim 1, wherein said apparatus provides a first adjustable wing supporter and a second adjustable wing supporter which stabilize said aircraft when at least one wheel of undercarriage in said aircraft remains open and rest of wheels of said aircraft remain closed.

* * * * *